United States Patent
Lin et al.

(10) Patent No.: US 10,548,042 B2
(45) Date of Patent: Jan. 28, 2020

(54) NETWORK ASSESSMENT METHOD AND APPARATUS

(71) Applicant: Huawei Technologies Co., Ltd., Shenzhen (CN)

(72) Inventors: Senling Lin, Shanghai (CN); Hai Lian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/858,385

(22) Filed: Dec. 29, 2017

(65) Prior Publication Data

US 2018/0192316 A1    Jul. 5, 2018

(30) Foreign Application Priority Data

Dec. 30, 2016  (CN) .......................... 2016 1 1254576

(51) Int. Cl.
| | |
|---|---|
| *H04W 24/10* | (2009.01) |
| *H04W 52/24* | (2009.01) |
| *H04W 24/06* | (2009.01) |
| *H04W 24/02* | (2009.01) |

(Continued)

(52) U.S. Cl.
CPC .......... *H04W 24/10* (2013.01); *H04W 24/06* (2013.01); *H04W 52/24* (2013.01); *H04W 24/02* (2013.01); *H04W 24/08* (2013.01); *H04W 36/0088* (2013.01); *Y02D 70/126* (2018.01); *Y02D 70/1262* (2018.01); *Y02D 70/142* (2018.01)

(58) Field of Classification Search
None
See application file for complete search history.

(56) References Cited

U.S. PATENT DOCUMENTS

| | | | |
|---|---|---|---|
| 2008/0170947 A1* | 7/2008 | Sutardja | G06F 1/206 417/32 |
| 2008/0220784 A1* | 9/2008 | Somasundaram | H04W 36/0085 455/437 |

(Continued)

FOREIGN PATENT DOCUMENTS

| | | |
|---|---|---|
| CN | 102413530 A | 4/2012 |
| CN | 103024945 A | 4/2013 |

(Continued)

OTHER PUBLICATIONS

Machine Translation and Abstract of Chinese Publication No. CN102413530, Apr. 11, 2012, 16 pages.

(Continued)

*Primary Examiner* — Kodzovi Acolatse
(74) *Attorney, Agent, or Firm* — Conley Rose, P.C.

(57) ABSTRACT

A method includes determining a network that can be monitored by a terminal as a to-be-assessed network. The method includes determining whether an absolute value of a signal-energy-value change speed of the to-be-assessed network is greater than a preset speed threshold, where the preset speed threshold is greater than 0. The method includes shortening an energy assessment period when the absolute value of the signal-energy-value change speed is greater than the preset speed threshold. The method includes performing signal energy assessment on the to-be-assessed network by using the shortened energy assessment period.

17 Claims, 5 Drawing Sheets

(51) Int. Cl.
    *H04W 36/00*     (2009.01)
    *H04W 24/08*     (2009.01)

(56)         References Cited

U.S. PATENT DOCUMENTS

| | | | |
|---|---|---|---|
| 2009/0257396 A1* | 10/2009 | Eliezer | H04B 1/036 |
| | | | 370/330 |
| 2012/0119948 A1* | 5/2012 | Tsuda | G01S 19/34 |
| | | | 342/357.29 |
| 2013/0053017 A1* | 2/2013 | Chang | H04W 24/10 |
| | | | 455/422.1 |
| 2017/0048772 A1* | 2/2017 | Gheorghiu | H04W 36/14 |
| 2017/0202022 A1* | 7/2017 | Chendamarai Kannan | |
| | | | H04W 72/0446 |
| 2018/0049162 A1* | 2/2018 | Patil | H04L 67/12 |
| 2018/0270822 A1* | 9/2018 | Chae | H04W 72/0453 |

FOREIGN PATENT DOCUMENTS

| | | | |
|---|---|---|---|
| CN | 103874124 A | 6/2014 |
| CN | 105101276 A | 11/2015 |

OTHER PUBLICATIONS

Machine Translation and Abstract of Chinese Publication No. CN103024945, Apr. 3, 2013, 13 pages.
Machine Translation and Abstract of Chinese Publication No. CN103874124, Jun. 18, 2014, 29 pages.
Machine Translation and Abstract of Chinese Publication No. CN105101276, Nov. 25, 2015, 19 pages.
Foreign Communication From a Counterpart Application, Chinese Application No. 201611254576.6, Chinese Office Action dated Aug. 2, 2019, 7 pages.

* cited by examiner

NETWORK ASSESSMENT METHOD AND APPARATUS

CROSS-REFERENCE TO RELATED APPLICATION

This application claims priority to Chinese Patent Application No. 201611254576.6, filed on Dec. 30, 2016, which is hereby incorporated by reference in its entirety.

TECHNICAL FIELD

This application relates to the communications field, and in particular, to a network assessment method and apparatus.

BACKGROUND

With development of communications technologies, there have been various formats of network. A Long Term Evolution (LTE) network and a Wireless Fidelity (Wi-Fi) network are two different frequently-used formats of network.

When a terminal is located in a coverage area of the Wi-Fi network and that of the LTE network at the same time, the terminal can access one network, and then communicate with a server by using the network accessed by the terminal. For example, the terminal can access the Wi-Fi network to communicate with the server. However, because network signal energy often changes, the terminal needs to perform signal energy assessment on each to-be-assessed network (for example, the Wi-Fi network or the LTE network) at regular intervals in one energy assessment period (for example, 600 milliseconds). For example, the terminal may perform signal energy assessment on the Wi-Fi network once every 100 milliseconds of 600 milliseconds to obtain one signal energy value of the Wi-Fi network, and perform signal energy assessment on the LTE network once every 100 milliseconds of 600 milliseconds to obtain one signal energy value of the LTE network. If in one energy assessment period, each obtained signal energy value of the Wi-Fi network is less than a preset energy threshold, and each obtained signal energy value of the LTE network is greater than the preset energy threshold, the terminal can determine that signal energy of the Wi-Fi network is weaker and signal energy of the LTE network is stronger. In this case, the terminal can directly disconnect from the Wi-Fi network and access the LTE network.

When to-be-assessed-network signal energy of the terminal changes at a fast speed, the terminal can determine whether the to-be-assessed-network signal energy is strong or weak still after one energy assessment period. Therefore, it takes a relatively long time for the terminal to perform signal energy assessment on the to-be-assessed network, and efficiency in signal energy assessment on the network is relatively low.

SUMMARY

This application provides a network assessment method and apparatus to resolve a problem of low efficiency in signal energy assessment on a network. The technical solutions are as follows.

According to a first aspect, a network assessment method is provided, where the method includes:

determining a network that can be monitored by a terminal as a to-be-assessed network;

determining whether an absolute value of a signal-energy-value change speed of the to-be-assessed network is greater than a preset speed threshold, where the preset speed threshold is greater than 0;

when the absolute value of the signal-energy-value change speed is greater than the preset speed threshold, shortening an energy assessment period; and performing signal energy assessment on the to-be-assessed network by using a shortened energy assessment period.

When determining that the signal-energy-value change speed of the to-be-assessed network is greater than the preset speed threshold, the terminal can determine that signal energy of the to-be-assessed network changes at a fast speed. In this case, the terminal can shorten the energy assessment period, that is, reduce a time of signal energy assessment on the to-be-assessed network, and perform signal energy assessment on the to-be-assessed network by using the shortened energy assessment period. In this way, the terminal can quickly determine whether the signal energy of the to-be-assessed network is strong or weak, so that efficiency in signal energy assessment on the network is improved.

In a related technology, when signal energy of a network currently accessed by a terminal decreases at a fast speed, the terminal can determine that the signal energy of the network currently accessed by the terminal is weak still after one energy assessment period, and then be handed over from the currently accessed network to another network with stronger signal energy. However, before the terminal is handed over to the another network with stronger signal energy, the signal energy of the network currently accessed by the terminal is quite weak. In this case, the terminal cannot perform data exchange by using the network currently accessed by the terminal. If a user is using the terminal to make a call by using the network, the terminal cannot maintain a normal call, and user experience of the terminal is poor.

In embodiments of the present disclosure, when signal energy of a network currently accessed by the terminal decreases at a fast speed, the terminal detects that the signal energy of the network currently accessed by the terminal changes at a fast speed. The terminal can shorten an energy assessment period, quickly determine that the signal energy of the network currently accessed by the terminal is weak, and then be quickly handed over from the network currently accessed by the terminal to another network with stronger signal energy. That is, the network assessment method provided in the embodiments of the present disclosure reduces a time during which the terminal cannot perform data exchange before being handed over to the another network with stronger signal energy, reduces a time during which the terminal cannot maintain a normal call, and improves user experience of the terminal.

Optionally, before the determining whether an absolute value of a signal-energy-value change speed of the to-be-assessed network is greater than a preset speed threshold, the method further includes:

obtaining m signal energy values obtained by means of m consecutive signal energy assessments on the to-be-assessed network, where time intervals are equal between every two consecutive signal energy assessments, an $m^{th}$ signal energy value is obtained by means of the $m^{th}$ signal energy assessment, an $n^{th}$ signal energy value is obtained by means of the $n^{th}$ signal energy assessment, m is an integer greater than or equal to 2, and n is an integer less than m;

determining a difference between the $m^{th}$ signal energy value and the $n^{th}$ signal energy value; and determining whether an absolute value of the difference is greater than a first signal energy difference threshold, where the first signal energy difference threshold is greater than 0; and the determining whether an absolute value of a signal-energy-value change speed of the to-be-assessed network is greater than a preset speed threshold includes:

when the absolute value of the difference is greater than the first signal energy difference threshold, determining whether the absolute value of the signal-energy-value change speed is greater than the preset speed threshold.

Generally, a network signal energy value fluctuates up and down around a stable value, and a fluctuation degree is small. If the step of determining whether a signal-energy-value change speed is greater than a preset speed threshold is performed at each fluctuation, workload of the terminal is increased, resulting in an increase in load of the terminal. However, in the embodiments of the present disclosure, before determining whether the absolute value of the signal-energy-value change speed is greater than the preset speed threshold, the terminal may first determine whether a variation of obtained signal energy values is large, and perform, only when the variation of the signal energy values is large, the step of determining whether the signal-energy-value change speed is greater than the preset speed threshold. This significantly decreases workload of the terminal, thereby reducing load of the terminal.

Optionally, the determining whether an absolute value of a signal-energy-value change speed of the to-be-assessed network is greater than a preset speed threshold includes:

determining whether the absolute value of the difference is greater than a second signal energy difference threshold, where the second signal energy difference threshold is greater than the first signal energy difference threshold; and when the absolute value of the difference is greater than the second signal energy difference threshold, determining that the absolute value of the signal-energy-value change speed is greater than the preset speed threshold.

Optionally, the method further includes:

when the absolute value of the signal-energy-value change speed is greater than the preset speed threshold, determining whether the absolute value of the difference is greater than a third signal energy difference threshold, where the third signal energy difference threshold is greater than the second signal energy difference threshold; and the shortening an energy assessment period includes:

when the absolute value of the difference is greater than the third signal energy difference threshold, shortening the energy assessment period to a first assessment period; or when the absolute value of the difference is not greater than the third signal energy difference threshold, shortening the energy assessment period to a second assessment period, where the second assessment period is greater than the first assessment period.

When the signal-energy-value change speed of the to-be-assessed network becomes faster, the terminal may shorten the energy assessment period more, so that the shortened energy assessment period becomes shorter, and the terminal can obtain an assessment result of the to-be-assessed network in a shorter time. The terminal may adjust, according to the signal-energy-value change speed of the to-be-assessed network, how much the energy assessment period is shortened. This ensures network assessment accuracy with network assessment efficiency improved.

Optionally, m is equal to 4, and n is equal to 1.

Optionally, the signal energy value is a received signal strength indicator (RSSI) value, the energy assessment period is 600 milliseconds, the second signal energy difference threshold is 5 decibels (dB), the third signal energy difference threshold is 10 dB, the first assessment period is 300 milliseconds, and the second assessment period is 400 milliseconds.

Optionally, the performing signal energy assessment on the to-be-assessed network by using a shortened energy assessment period includes:

obtaining at least one signal energy value obtained by means of at least one signal energy assessment on the to-be-assessed network in the shortened energy assessment period; and determining a network assessment result of the to-be-assessed network according to the at least one signal energy value.

According to a second aspect, a network assessment apparatus is provided, where the network assessment apparatus includes at least one module, and the at least one module is configured to implement the network assessment method in the first aspect or any possible implementation of the first aspect.

According to a third aspect, a network assessment apparatus is provided, where the network assessment apparatus includes at least one processor, at least one network interface, a memory, and at least one bus, where the memory and the network interface are separately connected to the processor by using the bus; the processor is configured to execute an instruction stored in the memory; and the processor implements, by executing the instruction, the network assessment method provided in the first aspect or any possible implementation of the first aspect.

Technical effects obtained in the second aspect and the third aspect are similar to those obtained by a corresponding technical means in the first aspect. Details are not described herein in this application.

The technical solutions provided in this application bring the following beneficial effects.

When determining that the signal-energy-value change speed of the to-be-assessed network is greater than the preset speed threshold, the terminal can determine that the signal energy of the to-be-assessed network changes at a fast speed. In this case, the terminal can shorten the energy assessment period, that is, reduce the time of signal energy assessment on the to-be-assessed network, and perform signal energy assessment on the to-be-assessed network by using the shortened energy assessment period. In this way, the terminal can quickly determine whether the signal energy of the to-be-assessed network is strong or weak, so that the efficiency in signal energy assessment on the network is improved.

DESCRIPTION OF EMBODIMENTS

To make the objectives, technical solutions, and advantages of this application clearer, the following further describes the implementations of this application in detail with reference to the accompanying drawings.

Figure 1:
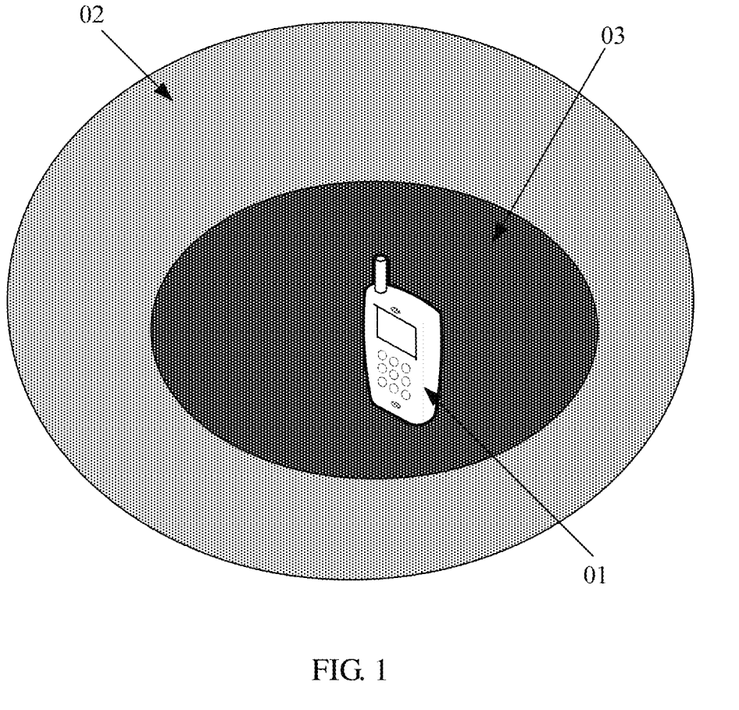
FIG. 1 is a schematic diagram of an application scenario of a network assessment method according to an embodiment of the present disclosure.

FIG. 1 is a schematic diagram of an application scenario of a network assessment method according to an embodiment of the present disclosure. As shown in FIG. 1, a terminal 01 may be located in both a coverage area of a first network 02 and a coverage area of a second network 03, and the terminal 01 can monitor the first network 02 and the second network 03. In addition, the terminal 01 may further access either the first network 02 or the second network 03. Optionally, the first network 02 may be a Wi-Fi network, and the second network 03 may be an LTE network. A coverage area of the Wi-Fi network is smaller than that of the LTE network.

For example, the terminal 01 may first perform network assessment separately on the first network 02 and the second network 03, and select, according to a result of the network assessment on the two networks, a network with a better network assessment result from the two networks for an access. After accessing a network, the terminal may further perform network assessment separately on the two networks. If a network assessment result of the network currently accessed by the terminal is relatively poor, and a network assessment result of the other network is relatively good, the terminal can disconnect from the network currently accessed by the terminal, and access the other network.

Figure 2:
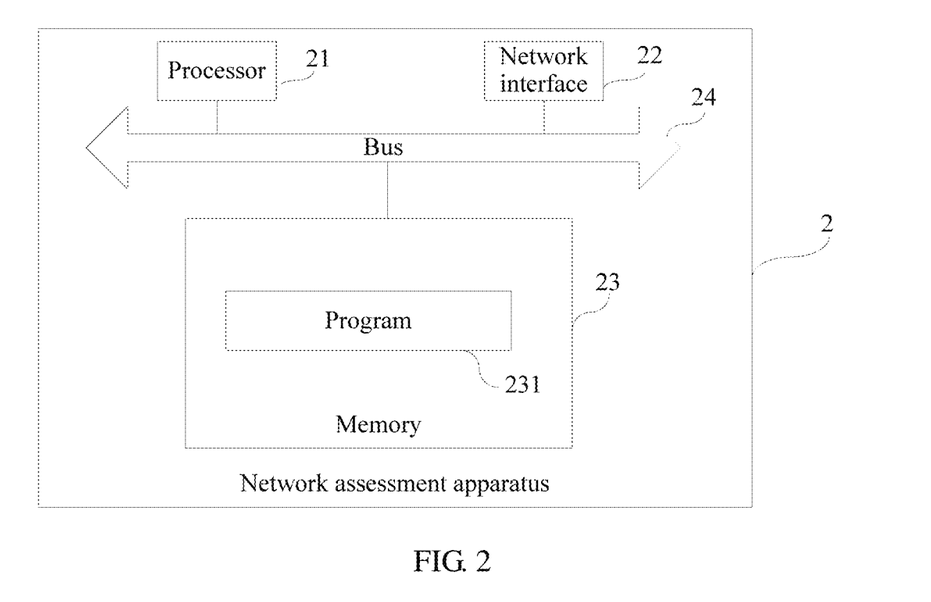
FIG. 2 is a schematic structural diagram of a network assessment apparatus according to an embodiment of the present disclosure.

FIG. 2 is a schematic structural diagram of a network assessment apparatus 2 according to an embodiment of the present disclosure. The network assessment apparatus 2 may be applied to the terminal 01 in FIG. 1. As shown in FIG. 2, the network assessment apparatus 2 may include at least one processor 21 (for example, a central processing unit (CPU)), at least one network interface 22, a memory 23, and at least one bus 24 that is configured to implement communicative connection between these apparatuses. The memory 23 and the network interface 22 may be separately connected to the processor 21 by using the bus 24. The processor 21 is configured to execute an executable module, such as a computer program, stored in the memory 23. The memory 23 may include a high-speed random access memory (RAM), or may further include a non-volatile memory such as at least one magnetic disk memory. The at least one network interface 22 (which may be wired or wireless) is used to implement communicative connection between the network assessment apparatus and at least one of other network elements. The Internet, a wide area network, a local network, a metropolitan area network, or the like may be used. In some implementations, the memory 23 stores a program 231, and the program 231 may be executed by the processor 21.

Figure 3:
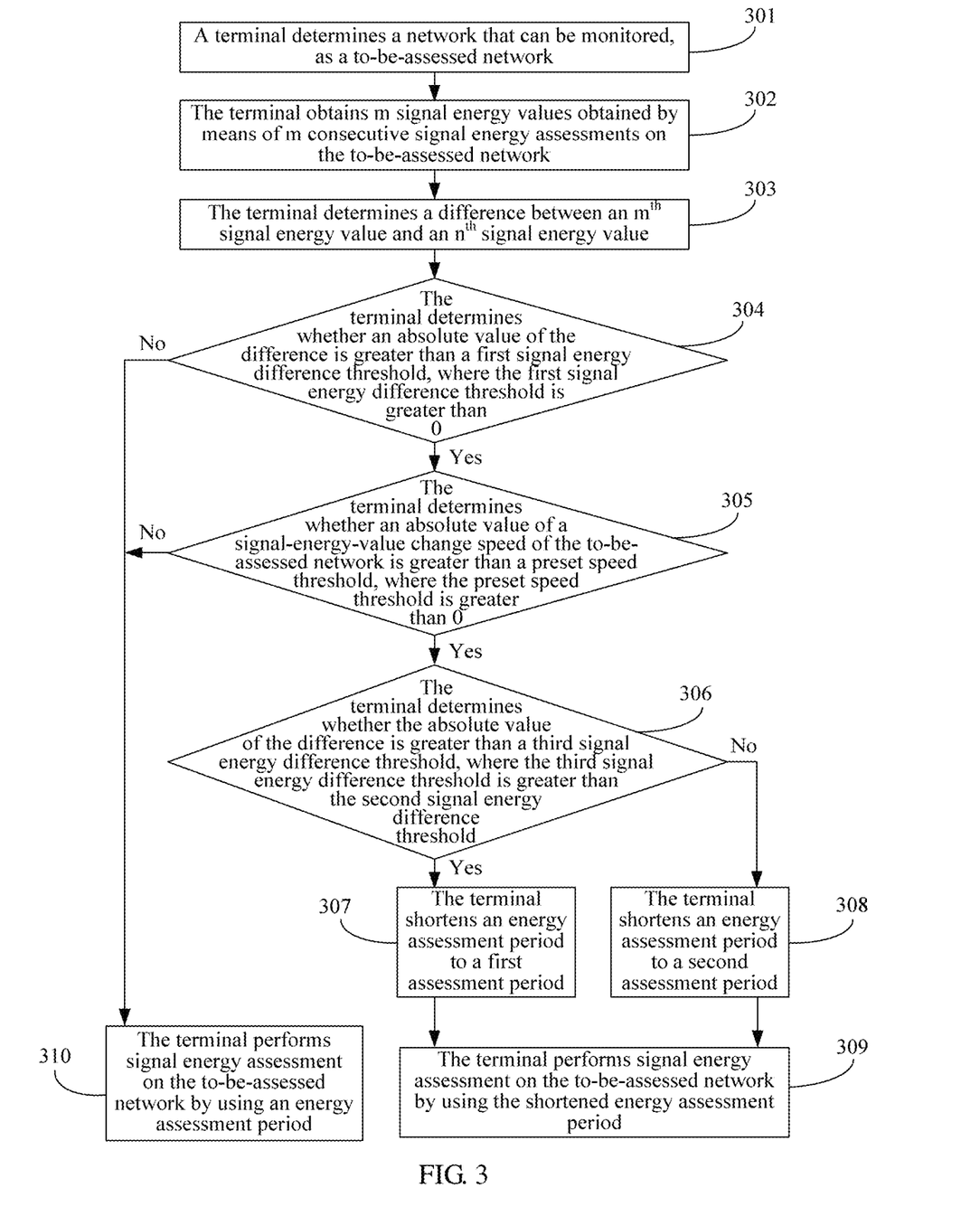
FIG. 3 is a schematic flowchart of a network assessment method according to an embodiment of the present disclosure.

FIG. 3 is a method flowchart of a network assessment method according to an embodiment of the present disclosure. The network assessment method may be applied to the terminal 01 in FIG. 1, and the network assessment method may be implemented by executing the program 231 by the processor 21 in FIG. 2. As shown in FIG. 3, the network assessment method may include the following steps.

Step 301: The terminal determines a network that can be monitored, as a to-be-assessed network, and then performs step 302.

For example, if the terminal is located in a coverage area of a network, the terminal can monitor the network. The terminal may determine any one of all networks that can be monitored, as the to-be-assessed network.

It should be noted that, regardless of whether the terminal has accessed a network currently, the terminal may determine any one network that can be monitored, as the to-be-assessed network, and then perform network assessment on the any one network that can be monitored. For example, the terminal may determine the first network or the second network in FIG. 1 as the to-be-assessed network.

Step 302: The terminal obtains m signal energy values obtained by means of m consecutive signal energy assessments on the to-be-assessed network, and then performs step 303.

After determining the to-be-assessed network, the terminal may perform assessment on the to-be-assessed network. For example, the terminal may perform multiple signal energy assessments on the to-be-assessed network in one energy assessment period (for example, 600 milliseconds), to obtain multiple signal energy values. During the multiple signal energy assessments, time intervals are equal between every two consecutive signal energy assessments. For example, the terminal may perform signal energy assessment once at time points of 100 milliseconds, 200 milliseconds, 300 milliseconds, 400 milliseconds, 500 milliseconds, and 600 milliseconds respectively, so as to obtain six signal energy values of the to-be-assessed network.

Then, the terminal may obtain, from the obtained multiple signal energy values, m signal energy values obtained by means of m consecutive signal energy assessments, where an $m^{th}$ signal energy value is obtained by means of the $m^{th}$ signal energy assessment, and m is an integer greater than or equal to 2. For example, the signal energy value in this embodiment of the present disclosure may be a RSSI value. In actual application, the signal energy value may be another type of signal energy value (for example, a signal-to-noise ratio value). This is not limited in this embodiment of the present disclosure.

For example, when m is equal to 4, four storage modules corresponding to the to-be-assessed network may be disposed on the terminal, such as a first storage module, a second storage module, a third storage module, and a fourth storage module. The fourth storage module may be configured to store a signal energy value m(t) obtained by means of a latest signal energy assessment, for example, a $t^{th}$ signal energy assessment. The third storage module may be configured to store a signal energy value m(t−1) obtained by means of a $(t-1)^{th}$ signal energy assessment. The second storage module may be configured to store a signal energy value m(t−2) obtained by means of a $(t-2)^{th}$ signal energy assessment. The first storage module may be configured to store a $(t-3)^{th}$ signal energy value m(t−3) obtained by means of a third previous signal energy assessment. When obtaining the m signal energy values, the terminal may directly obtain the signal energy value m(t), the signal energy value m(t−1), the signal energy value m(t−2), and the signal energy value m(t−3) from the four storage modules.

In the m consecutive signal energy assessments, a first signal energy value is obtained by means of the first signal energy assessment, that is, the signal energy value m(t−3); a second signal energy value is obtained by means of the second signal energy assessment, that is, the signal energy value m(t−2); a third signal energy value is obtained by means of the third signal energy assessment, that is, the signal energy value m(t−1); and a fourth signal energy value is obtained by means of the fourth signal energy assessment, that is, the signal energy value m(t). The fourth signal energy value is the $m^{th}$ signal energy value.

It should be noted that the terminal may repeatedly execute the network assessment method shown in FIG. 2. When executing the network assessment method for the second time, the terminal may delete the signal energy value m(t−3) stored in the first storage module when the network assessment method is executed for the first time, and store the signal energy value m(t−2) in the first storage module. Then, the terminal stores the signal energy value m(t−1) in the second storage module, stores the signal energy value m(t) in the third storage module, performs one signal energy assessment again on the to-be-assessed network, and stores an obtained signal energy value in the fourth storage module.

Step 303: The terminal determines a difference between an $m^{th}$ signal energy value and an $n^{th}$ signal energy value, and then performs step 304.

n may be an integer less than m, and the $n^{th}$ signal energy value is obtained by means of the $n^{th}$ signal energy assessment. For example, m may be equal to 4, and n may be equal to 1. In this case, the $m^{th}$ signal energy value is the fourth signal energy value m(t), and the $n^{th}$ signal energy value is the first signal energy value m(t−3). In actual application, m may not be 4, and n may not be 1. This is not limited in this embodiment of the present disclosure.

For example, the terminal may perform subtraction on the $m^{th}$ signal energy value and the $n^{th}$ signal energy value to obtain a difference between the $m^{th}$ signal energy value and the $n^{th}$ signal energy value: dm=m(t)−m(t−3).

Step 304: The terminal determines whether an absolute value of the difference is greater than a first signal energy difference threshold, where the first signal energy difference threshold is greater than 0. If the absolute value of the difference is greater than the first signal energy difference threshold, step 305 is performed; or if the absolute value of the difference is not greater than the first signal energy difference threshold, step 310 is performed.

After obtaining the difference dm between the $m^{th}$ signal energy value and the $n^{th}$ signal energy value, the terminal may further obtain an absolute value Abs(dm) of the difference dm between the $m^{th}$ signal energy value and the $n^{th}$ signal energy value. Abs is short for absolute value.

The first signal energy difference threshold may be preset on the terminal. After obtaining the Abs(dm), the terminal may further compare the Abs(dm) with the first signal energy difference threshold and determine whether the Abs(dm) is greater than the first signal energy difference threshold. When the Abs(dm) is greater than the first signal energy difference threshold, the terminal may determine that current signal energy of the to-be-assessed network changes fast, and perform step 305.

Generally, a network signal energy value fluctuates up and down around a stable value, and a fluctuation degree is small. If step 305 and another determining step are performed at each fluctuation, workload of the terminal is increased, resulting in an increase in load of the terminal. However, in this embodiment of the present disclosure, before determining whether an absolute value of a signal-energy-value change speed is greater than a preset speed threshold, the terminal may first determine whether a variation of obtained signal energy values is large, and perform, only when the variation of the signal energy values is large, the step of determining whether the signal-energy-value change speed is greater than the preset speed threshold. This significantly decreases workload of the terminal, thereby reducing load of the terminal.

Step 305: The terminal determines whether an absolute value of a signal-energy-value change speed of the to-be-assessed network is greater than a preset speed threshold, where the preset speed threshold is greater than 0. If the absolute value of the signal-energy-value change speed is greater than the preset speed threshold, step 306 is performed; or if the absolute value of the signal-energy-value change speed is not greater than the preset speed threshold, step 310 is performed.

When determining that the current signal energy of the to-be-assessed network changes fast, the terminal may determine whether the absolute value of the signal-energy-value change speed is greater than the preset speed threshold. If the absolute value of the signal-energy-value change speed is greater than the preset speed threshold, the terminal may determine that the current signal-energy-value change speed of the to-be-assessed network already reaches a status in which signal energy can be determined only by quick detection. In this case, the terminal may perform step 306.

For example, when determining whether the absolute value of the signal-energy-value change speed of the to-be-assessed network is greater than the preset speed threshold, the terminal may directly determine whether the absolute value Abs(dm) of the difference dm is greater than a second signal energy difference threshold, where the second signal energy difference threshold is greater than the first signal energy difference threshold. When the absolute value Abs(dm) of the difference dm is greater than the second signal energy difference threshold, the terminal may determine that the absolute value of the signal-energy-value change speed is greater than the preset speed threshold. Optionally, the second signal energy difference threshold may be 5 dB.

Step 306: The terminal determines whether the absolute value of the difference is greater than a third signal energy difference threshold, where the third signal energy difference threshold is greater than the second signal energy difference threshold. If the absolute value of the difference is greater than the third signal energy difference threshold, step 307 is performed. If the absolute value of the difference is not greater than the third signal energy difference threshold, step 308 is performed.

When determining that the absolute value of the signal-energy-value change speed is greater than the preset speed threshold, the terminal may further determine whether the absolute value Abs(dm) of the difference dm is greater than the third signal energy difference value. If the absolute value Abs(dm) of the difference dm is greater than the second signal energy difference and greater than the third signal energy difference, the terminal may determine that the signal energy change speed of the to-be-assessed network is particularly fast in this case, and the terminal needs to perform step 307. If the absolute value Abs(dm) of the difference dm is greater than the second signal energy difference and not greater than (less than or equal to) the third signal energy difference, the terminal may determine that the signal energy change speed of the to-be-assessed network is not particularly fast in this case, and the terminal may perform step 308. Optionally, the third signal energy difference threshold may be 10 dB.

Step 307: The terminal shortens an energy assessment period to a first assessment period, and then performs step 309.

When the signal energy change speed of the to-be-assessed network is particularly fast, the terminal may shorten the energy assessment period, in which network assessment is performed on the to-be-assessed network, to the first assessment period. For example, a 600-millisecond energy assessment period is shortened by 300 milliseconds, to obtain the first assessment period of 300 milliseconds.

Step 308: The terminal shortens an energy assessment period to a second assessment period, and then performs step 309.

When the signal energy change speed of the to-be-assessed network is fast but not particularly fast, the terminal may shorten the energy assessment period, in which network assessment is performed on the to-be-assessed network, to the second assessment period, where the second assessment period may be greater than the first assessment period. For example, the 600-millisecond energy assessment period is shortened by 200 milliseconds, to obtain the second assessment period of 400 milliseconds, where the second assessment period of 400 milliseconds is greater than the first assessment period of 300 milliseconds.

That is, when the signal-energy-value change speed of the to-be-assessed network becomes faster, the terminal may shorten the energy assessment period more, so that the shortened energy assessment period becomes shorter, and the terminal can obtain an assessment result of the to-be-assessed network in a shorter time. The terminal may adjust, according to the signal-energy-value change speed of the to-be-assessed network, how much the energy assessment period is shortened. This ensures network assessment accuracy with network assessment efficiency improved.

Step 309: The terminal performs signal energy assessment on the to-be-assessed network by using the shortened energy assessment period.

After the energy assessment period is shortened, the terminal may perform signal energy assessment on the to-be-assessed network by using the shortened energy assessment period. For example, the terminal may perform at least one signal energy assessment on the to-be-assessed network in the first assessment period (the shortened energy assessment period in step 307) to obtain at least one signal energy value. For example, in the first assessment period of 300 milliseconds, three signal energy assessments are performed to obtain three signal energy values. The terminal may alternatively perform at least one signal energy assessment on the to-be-assessed network in the second assessment period (the shortened energy assessment period in step 308) to obtain at least one signal energy value. For example, in the second assessment period of 400 milliseconds, four signal energy assessments are performed to obtain four signal energy values.

Optionally, if the terminal performs signal energy assessment on the to-be-assessed network by using the shortened energy assessment period, and a signal energy value of the obtained at least one signal energy value is greater than a preset energy threshold, the terminal may determine that current signal energy of the to-be-assessed network is strong. If the terminal performs signal energy assessment on the to-be-assessed network by using the shortened energy assessment period, and none of the obtained at least one signal energy value is greater than (less than or equal to) a preset energy threshold, the terminal may determine that current signal energy of the to-be-assessed network is weak.

Step 310: The terminal performs signal energy assessment on the to-be-assessed network by using an energy assessment period.

If in step 304, the terminal determines that the absolute value Abs(dm) of the difference dm between the $m^{th}$ signal energy value and the $n^{th}$ signal energy value is not greater than the first signal energy difference threshold, or in step 305, the terminal determines that the absolute value of the signal-energy-value change speed is not greater than the preset speed threshold, the terminal may directly perform step 310. That is, the terminal may perform signal energy assessment on the to-be-assessed network still by using the non-shortened energy assessment period. In a 600-millisecond energy assessment period, six signal energy assessments are performed on the to-be-assessed network to obtain six signal energy values.

Optionally, if a signal energy value of the six signal energy values is greater than the preset energy threshold, the terminal may determine that current signal energy of the to-be-assessed network is strong. If none of the six signal energy values is greater than (less than or equal to) the preset energy threshold, the terminal may determine current signal energy of the to-be-assessed network is weak.

For example, after the signal energy assessment in step 309 or step 310 is completed, the terminal may further perform the following steps according to a current scenario of the terminal.

In a scenario, the terminal can monitor only one network, and the network is the to-be-assessed network. If the terminal does not access any network currently, regardless of whether signal energy in a network assessment result of the to-be-assessed network is strong or weak in step 309 or step 310, the terminal may access the to-be-assessed network after step 309 or step 310. If the terminal has accessed the to-be-assessed network currently, regardless of whether signal energy in a network assessment result of the to-be-assessed network is strong or weak in step 309 or step 310, the terminal may not be handed over to the to-be-assessed network after step 309 or step 310.

In another scenario, the terminal can monitor multiple networks. The terminal may use each network that can be monitored, as the to-be-assessed network, and simultaneously perform network assessment on each to-be-assessed network (that is, execute the network assessment method shown in FIG. 3), to obtain a network assessment result of each to-be-assessed network. On one hand, if the terminal does not access any network currently, after step 309 or step 310, the terminal may select one network with strong signal energy for an access from the multiple networks according to the network assessment result of each to-be-assessed network. On the other hand, if the terminal has accessed a network currently, signal energy in a network assessment result of the network is weak, and signal energy in a network assessment result of another network is strong, after step 309 or step 310, the terminal may directly disconnect from the network and access the another network, and be handed over from the network to the another network, so as to ensure that the terminal can always establish a connection with a network with strong signal energy.

Further, in a related technology, when signal energy of a network currently accessed by a terminal decreases at a fast speed, the terminal can determine that the signal energy of the network currently accessed by the terminal is weak still after one energy assessment period, and then be handed over from the currently accessed network to another network with stronger signal energy. However, before the terminal is handed over to the another network with stronger signal energy, the signal energy of the network currently accessed by the terminal is quite weak. In this case, the terminal cannot perform data exchange by using the network currently accessed by the terminal. If a user is using the terminal to make a call by using the network, the terminal cannot maintain a normal call, and user experience of the terminal is poor. In this embodiment of the present disclosure, when signal energy of a network currently accessed by the terminal decreases at a fast speed, the terminal detects that the signal energy of the network currently accessed by the terminal changes at a fast speed. The terminal can shorten an energy assessment period, quickly determine that the signal energy of the network currently accessed by the terminal is weak, and then be quickly handed over from the network currently accessed by the terminal to another network with stronger signal energy. That is, the network assessment method provided in this embodiment of the present disclosure reduces a time during which the terminal cannot perform data exchange before being handed over to the another network with stronger signal energy, reduces a time during which the terminal cannot maintain a normal call, and improves user experience of the terminal.

It should be noted that the order of the network assessment method steps in this embodiment of the present disclosure may be appropriately adjusted, and the steps may also be correspondingly added or deleted according to a situation. All variant methods readily figured out by a person skilled in the art within the technical scope disclosed in this application shall fall within the protection scope of this application, and therefore are not described.

In conclusion, in the network assessment method provided in this embodiment of the present disclosure, when determining that the signal-energy-value change speed of the to-be-assessed network is greater than the preset speed threshold, the terminal can determine that the signal energy of the to-be-assessed network changes at a fast speed. In this case, the terminal can shorten the energy assessment period, that is, reduce a time of signal energy assessment on the to-be-assessed network, and perform signal energy assessment on the to-be-assessed network by using the shortened energy assessment period. In this way, the terminal can quickly determine whether the signal energy of the to-be-assessed network is strong or weak, so that efficiency in signal energy assessment on the network is improved.

Figure 4:
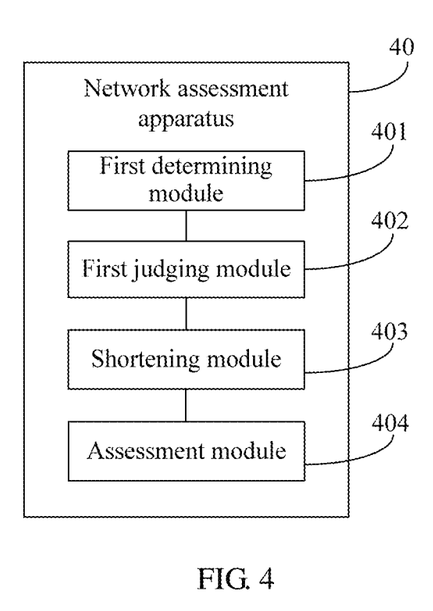
FIG. 4 is a schematic structural diagram of another network assessment apparatus according to an embodiment of the present disclosure.

FIG. 4 is a schematic structural diagram of another network assessment apparatus 40 according to an embodiment of the present disclosure. The network assessment apparatus 40 may be applied to the terminal 01 in FIG. 1. As shown in FIG. 4, the network assessment apparatus 40 may include:

a first determining module 401, configured to determine a network that can be monitored by a terminal as a to-be-assessed network;

a first judging module 402, configured to determine whether an absolute value of a signal-energy-value change speed of the to-be-assessed network is greater than a preset speed threshold, where the preset speed threshold is greater than 0;

a shortening module 403, configured to, when the absolute value of the signal-energy-value change speed is greater than the preset speed threshold, shorten an energy assessment period; and an assessment module 404, configured to perform signal energy assessment on the to-be-assessed network by using a shortened energy assessment period.

In conclusion, in the network assessment apparatus provided in this embodiment of the present disclosure, when the first determining module and the first judging module determine that the signal-energy-value change speed of the to-be-assessed network is greater than the preset speed threshold, the shortening module can shorten the energy assessment period, that is, reduce a time of signal energy assessment on the to-be-assessed network, and the assessment module performs signal energy assessment on the to-be-assessed network by using the shortened energy assessment period. In this way, the terminal can quickly determine whether the signal energy of the to-be-assessed network is strong or weak, so that efficiency in signal energy assessment on the network is improved.

The first determining module 401 may be configured to execute the method in step 301 in the embodiment shown in FIG. 3. The first judging module 402 may be configured to execute the method in step 305 in the embodiment shown in FIG. 3. The shortening module 403 may be configured to execute the method in step 307 and step 308 in the embodiment shown in FIG. 3. The assessment module 404 may be configured to execute the method in step 309 in the embodiment shown in FIG. 3.

Figure 5:
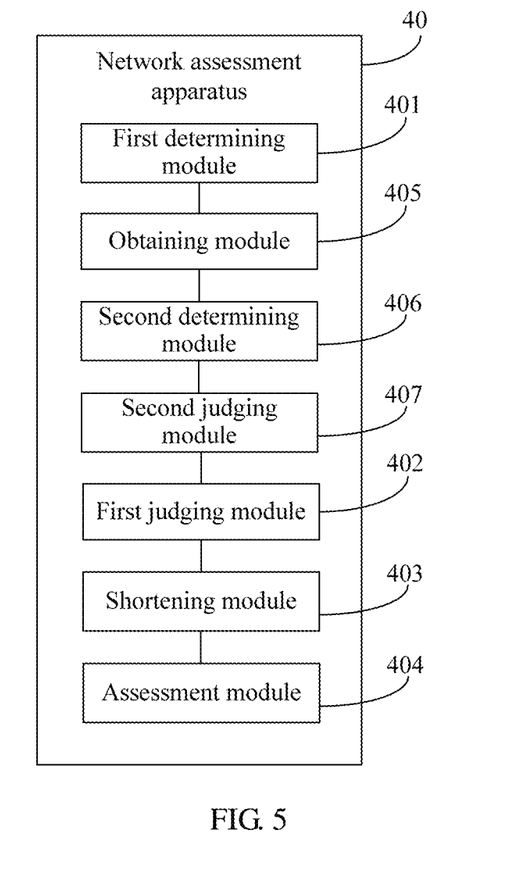
FIG. 5 is a schematic structural diagram of still another network assessment apparatus according to an embodiment of the present disclosure.

FIG. 5 is a schematic structural diagram of still another network assessment apparatus 40 according to an embodiment of the present disclosure. As shown in FIG. 5, based on FIG. 4, the network assessment apparatus 40 may further include an obtaining module 405, a second determining module 406, and a second judging module 407.

The obtaining module 405 is configured to obtain m signal energy values obtained by means of m consecutive signal energy assessments on the to-be-assessed network, where time intervals are equal between every two consecutive signal energy assessments, an $m^{th}$ signal energy value is obtained by means of the $m^{th}$ signal energy assessment, an $n^{th}$ signal energy value is obtained by means of the $n^{th}$ signal energy assessment, m is an integer greater than or equal to 2, and n is an integer less than m. The obtaining module 405 may be configured to execute the method in step 302 in the embodiment shown in FIG. 3.

The second determining module 406 is configured to determine a difference between the $m^{th}$ signal energy value and the $n^{th}$ signal energy value. The second determining module 406 may be configured to execute the method in step 303 in the embodiment shown in FIG. 3.

The second judging module 407 is configured to determine whether an absolute value of the difference is greater than a first signal energy difference threshold, where the first signal energy difference threshold is greater than 0. The second judging module 407 may be configured to execute the method in step 304 in the embodiment shown in FIG. 3.

The first judging module 402 may be further configured to: when the absolute value of the difference is greater than the first signal energy difference threshold, determine whether the absolute value of the signal-energy-value change speed is greater than the preset speed threshold.

Optionally, the first judging module 402 may be further configured to:

determine whether the absolute value of the difference is greater than a second signal energy difference threshold, where the second signal energy difference threshold is greater than the first signal energy difference threshold; and when the absolute value of the difference is greater than the second signal energy difference threshold, determine that the absolute value of the signal-energy-value change speed is greater than the preset speed threshold.

Figure 6:
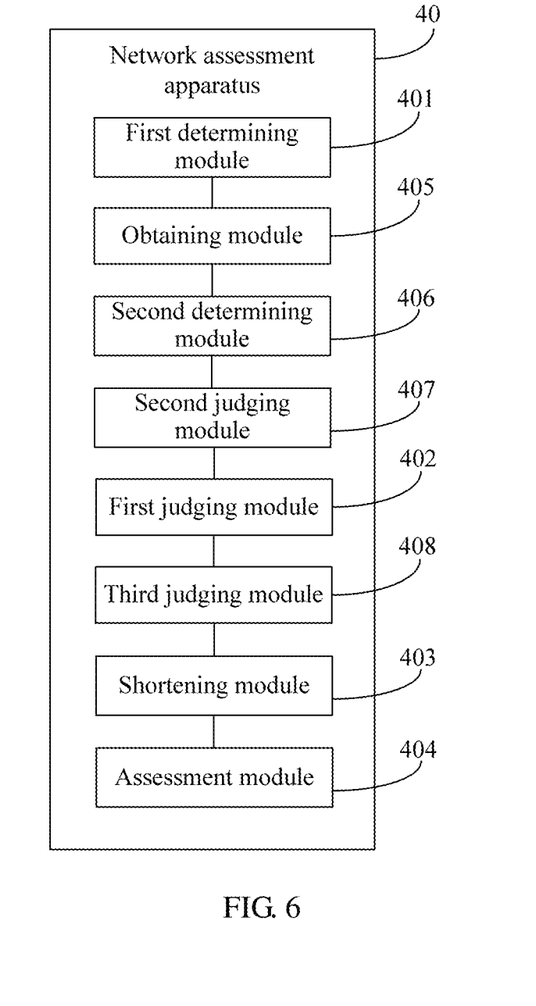
FIG. 6 is a schematic structural diagram of yet another network assessment apparatus according to an embodiment of the present disclosure.

FIG. 6 is a schematic structural diagram of yet another network assessment apparatus 40 according to an embodiment of the present disclosure. As shown in FIG. 6, based on FIG. 5, the network assessment apparatus 40 may further include a third judging module 408.

The third judging module 408 is configured to: when the absolute value of the signal-energy-value change speed is greater than the preset speed threshold, determine whether the absolute value of the difference is greater than a third signal energy difference threshold, where the third signal energy difference threshold is greater than the second signal energy difference threshold. The third judging module 408 may be configured to execute the method in step 306 in the embodiment shown in FIG. 3.

The shortening module 403 may be further configured to:

when the absolute value of the difference is greater than the third signal energy difference threshold, shorten the energy assessment period to a first assessment period; or when the absolute value of the difference is not greater than the third signal energy difference threshold, shorten the energy assessment period to a second assessment period, where the second assessment period is greater than the first assessment period.

Optionally, m is equal to 4, and n is equal to 1.

Optionally, the signal energy value is a RSSI value, the energy assessment period is 600 milliseconds, the second signal energy difference threshold is 5 dB, the third signal energy difference threshold is 10 dB, the first assessment period is 300 milliseconds, and the second assessment period is 400 milliseconds.

Optionally, the assessment module 404 may be further configured to:

obtain at least one signal energy value obtained by means of at least one signal energy assessment on the to-be-assessed network in the shortened energy assessment period; and determine a network assessment result of the to-be-assessed network according to the at least one signal energy value.

In conclusion, in the network assessment apparatus provided in this embodiment of the present disclosure, when the first determining module and the first judging module determine that the signal-energy-value change speed of the to-be-assessed network is greater than the preset speed threshold, the shortening module can shorten the energy assessment period, that is, reduce a time of signal energy assessment on the to-be-assessed network, and the assessment module performs signal energy assessment on the to-be-assessed network by using the shortened energy assessment period. In this way, the terminal can quickly determine whether the signal energy of the to-be-assessed network is strong or weak, so that efficiency in signal energy assessment on the network is improved.

The sequence numbers of the foregoing embodiments of the present disclosure are merely for illustrative purposes, and are not intended to indicate priorities of the embodiments.

It should be noted that the network assessment method embodiment and the network assessment apparatus embodiment that are provided in the embodiments of the present disclosure can be referred to each other. This is not limited in the embodiments of the present disclosure.

A person of ordinary skill in the art may understand that all or some of the steps of the embodiments may be implemented by hardware or a program instructing related hardware. The program may be stored in a computer-readable storage medium. The storage medium may include a read-only memory (ROM), a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A network assessment method implemented by a terminal, comprising:

determining a to-be-assessed network, wherein the to-be-assessed network is a network that is monitored by the terminal;

obtaining m signal energy values using m consecutive signal energy assessments on the to-be-assessed network, wherein time intervals between every two consecutive signal energy assessments are equal, wherein an $m^{th}$ signal energy value corresponds to an $m^{th}$ signal energy assessment, wherein an $n^{th}$ signal energy value corresponds to an $n^{th}$ signal energy assessment, wherein m is an integer greater than or equal to 2, and wherein n is an integer less than the m;

determining whether an absolute value of a difference between the $m^{th}$ signal energy value and the $n^{th}$ signal energy value is greater than a first signal energy difference threshold, wherein the first signal energy difference threshold is greater than 0;

determining whether an absolute value of a speed of change of signal energy values of the to-be-assessed network is greater than a preset speed threshold when the absolute value of the difference is greater than the first signal energy difference threshold, wherein the speed of change of signal energy values is different from the absolute value of the difference, and wherein the preset speed threshold is greater than 0;

shortening an energy assessment period to obtain a shortened energy assessment period when the absolute value of the speed of change in the signal energy values is greater than the preset speed threshold; and performing signal energy assessment on the to-be-assessed network using the shortened energy assessment period.

2. The network assessment method of claim 1, wherein determining whether the absolute value of the speed of change in the signal energy values is greater than the preset speed threshold comprises:

determining whether the absolute value of the difference is greater than a second signal energy difference threshold, wherein the second signal energy difference threshold is greater than the first signal energy difference threshold; and determining that the absolute value of the speed of change in the signal energy values is greater than the preset speed threshold when the absolute value of the difference is greater than the second signal energy difference threshold.

3. The network assessment method of claim 2, wherein the method further comprises determining whether the absolute value of the difference is greater than a third signal energy difference threshold when the absolute value of the speed of change in the signal energy values is greater than the preset speed threshold, wherein the third signal energy difference threshold is greater than the second signal energy difference threshold, and wherein shortening the energy assessment period comprises:

shortening the energy assessment period to a first assessment period when the absolute value of the difference is greater than the third signal energy difference threshold; or shortening the energy assessment period to a second assessment period when the absolute value of the difference is not greater than the third signal energy difference threshold, wherein the second assessment period is greater than the first assessment period.

4. The network assessment method of claim 3, wherein the signal energy value comprises a received signal strength indicator (RSSI) value, wherein the energy assessment period is 600 milliseconds, wherein the second signal energy difference threshold is 5 decibels (dB), wherein the third signal energy difference threshold is 10 dB, wherein the first assessment period is 300 milliseconds, and wherein the second assessment period is 400 milliseconds.

5. The network assessment method of claim 3, wherein the signal energy value comprises a signal-to-noise ratio (SNR) value, wherein the energy assessment period is 600 milliseconds, wherein the second signal energy difference threshold is 5 decibels (dB), wherein the third signal energy difference threshold is 10 dB, wherein the first assessment period is 300 milliseconds, and wherein the second assessment period is 400 milliseconds.

6. The network assessment method of claim 1, wherein the m is equal to 4, and wherein n is equal to 1.

7. The network assessment method of claim 1, wherein performing the signal energy assessment on the to-be-assessed network using the shortened energy assessment period comprises:
 obtaining at least one signal energy value using at least one signal energy assessment on the to-be-assessed network in the shortened energy assessment period; and
 determining a network assessment result of the to-be-assessed network according to the at least one signal energy value.

8. A network assessment apparatus in a terminal, comprising:
 a memory storage comprising instructions; and
 a processor coupled to the memory storage and configured to execute the instructions to cause the network assessment apparatus to:
  determine a to-be-assessed network, wherein the to-be-assessed network is a network that is monitored by the terminal;
  obtain m signal energy values using m consecutive signal energy assessments on the to-be-assessed network, wherein time intervals between every two consecutive signal energy assessments are equal, wherein an $m^{th}$ signal energy value corresponds to an $m^{th}$ signal energy assessment, wherein an $n^{th}$ signal energy value corresponds to an $n^{th}$ signal energy assessment, wherein m is an integer greater than or equal to 2, and wherein n is an integer less than the m;
  determine whether an absolute value of a difference between the $m^{th}$ signal energy value and the $n^{th}$ signal energy value is greater than a first signal energy difference threshold, wherein the first signal energy difference threshold is greater than 0;
  determine whether an absolute value of a speed of change of signal energy values of the to-be-assessed network is greater than a preset speed threshold when the absolute value of the difference is greater than the first signal energy difference threshold, wherein the speed of change of signal energy values is different from the absolute value of the difference, and wherein the preset speed threshold is greater than 0;
  shorten an energy assessment period to obtain a shortened energy assessment period when the absolute value of the speed of change of signal energy values is greater than the preset speed threshold; and
  perform signal energy assessment on the to-be-assessed network using the shortened energy assessment period.

9. The network assessment apparatus of claim 8, wherein the instructions further cause the network assessment apparatus to:
 determine whether the absolute value of the difference is greater than a second signal energy difference threshold, wherein the second signal energy difference threshold is greater than the first signal energy difference threshold; and
 determine that the absolute value of the speed of change in the signal energy values is greater than the preset speed threshold when the absolute value of the difference is greater than the second signal energy difference threshold.

10. The network assessment apparatus of claim 9, wherein the instructions further cause the network assessment apparatus to:
 determine whether the absolute value of the difference is greater than a third signal energy difference threshold when the absolute value of the speed of change in the signal energy values is greater than the preset speed threshold, wherein the third signal energy difference threshold is greater than the second signal energy difference threshold;
 shorten the energy assessment period to a first assessment period when the absolute value of the difference is greater than the third signal energy difference threshold; and
 shorten the energy assessment period to a second assessment period when the absolute value of the difference is not greater than the third signal energy difference threshold, wherein the second assessment period is greater than the first assessment period.

11. The network assessment apparatus of claim 10, wherein the signal energy value comprises a received signal strength indicator (RSSI) value, wherein the energy assessment period is 600 milliseconds, wherein the second signal energy difference threshold is 5 decibels (dB), wherein the third signal energy difference threshold is 10 dB, wherein the first assessment period is 300 milliseconds, and wherein the second assessment period is 400 milliseconds.

12. The network assessment apparatus of claim 10, wherein the signal energy value comprises a signal-to-noise ratio (SNR) value, wherein the energy assessment period is 600 milliseconds, wherein the second signal energy difference threshold is 5 decibels (dB), wherein the third signal energy difference threshold is 10 dB, wherein the first assessment period is 300 milliseconds, and wherein the second assessment period is 400 milliseconds.

13. The network assessment apparatus of claim 8, wherein the m is equal to 4, and wherein n is equal to 1.

14. The network assessment apparatus of claim 8, wherein the instructions further cause the network assessment apparatus to:
 obtain at least one signal energy value using at least one signal energy assessment on the to-be-assessed network in the shortened energy assessment period; and
 determine a network assessment result of the to-be-assessed network according to the at least one signal energy value.

15. A computer program product comprising computer executable instructions stored on a non-transitory computer-readable medium that, when executed by a processor on a network assessment apparatus of a terminal, cause the network assessment apparatus to:

determine a to-be-assessed network, wherein the to-be-assessed network is a network that is monitored by the terminal;

obtain m signal energy values using m consecutive signal energy assessments on the to-be-assessed network, wherein time intervals between every two consecutive signal energy assessments are equal, wherein an $m^{th}$ signal energy value corresponds to an $m^{th}$ signal energy assessment, wherein an $n^{th}$ signal energy value corresponds to an nth signal energy assessment, wherein m is an integer greater than or equal to 2, and wherein n is an integer less than them;

determine whether an absolute value of a difference between the $m^{th}$ signal energy value and the $n^{th}$ signal energy value is greater than a first signal energy difference threshold, wherein the first signal energy difference threshold is greater than 0;

determine whether an absolute value of a speed of change of signal energy values of the to-be-assessed network is greater than a preset speed threshold when the absolute value of the difference is greater than the first signal energy difference threshold, wherein the speed of change of signal energy values is different from the absolute value of the difference, and wherein the preset speed threshold is greater than 0;

shorten an energy assessment period to obtain a shortened energy assessment period when the absolute value of the speed of change in the signal energy values is greater than the preset speed threshold; and perform signal energy assessment on the to-be-assessed network using the shortened energy assessment period.

16. The computer program product of claim 15, wherein the instructions further cause the network assessment apparatus to:

determine whether the absolute value of the difference is greater than a second signal energy difference threshold, wherein the second signal energy difference threshold is greater than the first signal energy difference threshold; and determine that the absolute value of the speed of change in the signal energy values is greater than the preset speed threshold when the absolute value of the difference is greater than the second signal energy difference threshold.

17. The computer program product of claim 16, wherein the instructions further cause the network assessment apparatus to:

determine whether the absolute value of the difference is greater than a third signal energy difference threshold when the absolute value of the speed of change in the signal energy values is greater than the preset speed threshold, wherein the third signal energy difference threshold is greater than the second signal energy difference threshold;

shorten the energy assessment period to a first assessment period when the absolute value of the difference is greater than the third signal energy difference threshold; and shorten the energy assessment period to a second assessment period when the absolute value of the difference is not greater than the third signal energy difference threshold, wherein the second assessment period is greater than the first assessment period.

* * * * *

UNITED STATES PATENT AND TRADEMARK OFFICE
CERTIFICATE OF CORRECTION

| | |
|---|---|
| PATENT NO. | : 10,548,042 B2 |
| APPLICATION NO. | : 15/858385 |
| DATED | : January 28, 2020 |
| INVENTOR(S) | : Senling Lin and Hai Lian |

Page 1 of 1

It is certified that error appears in the above-identified patent and that said Letters Patent is hereby corrected as shown below:

In the Claims

Claim 15, Column 17, Line 12: "to an nth signal" should read "to an $n^{th}$ signal"

Signed and Sealed this
Tenth Day of March, 2020

Andrei Iancu
*Director of the United States Patent and Trademark Office*